United States Patent

Meringdal et al.

[11] Patent Number: 6,145,383
[45] Date of Patent: Nov. 14, 2000

[54] PRESSURE SENSOR

[75] Inventors: Frode Meringdal, Lillestrøm; Bjørn Erik Seeberg, Oslo, both of Norway

[73] Assignee: Nyfotek AS, Trondheim, Norway

[21] Appl. No.: 09/125,775

[22] PCT Filed: Feb. 20, 1997

[86] PCT No.: PCT/NO97/00053

§ 371 Date: Aug. 26, 1998

§ 102(e) Date: Aug. 26, 1998

[87] PCT Pub. No.: WO97/32190

PCT Pub. Date: Sep. 4, 1997

[30] Foreign Application Priority Data

Feb. 27, 1996 [NO] Norway ................................ 960779

[51] Int. Cl.[7] .................................................. G01L 9/06
[52] U.S. Cl. .................................................. 73/727
[58] Field of Search .................... 73/700, 715, 718, 73/720, 721, 724, 726, 727, 733, 756

[56] References Cited

U.S. PATENT DOCUMENTS

| | | | |
|---|---|---|---|
| 3,645,136 | 2/1972 | Calhoun | 73/393 |
| 4,481,497 | 11/1984 | Kurtz et al. | 338/2 |
| 4,519,254 | 5/1985 | Sonderegger et al. | 73/726 |
| 4,984,467 | 1/1991 | Haefner | 73/721 |
| 5,024,098 | 6/1991 | Petitjean et al. | 73/729 |

FOREIGN PATENT DOCUMENTS

| | | |
|---|---|---|
| 0107549 | 5/1984 | European Pat. Off. . |
| 0373010 | 10/1989 | European Pat. Off. . |
| 3940861 | 6/1990 | Germany . |
| 576132 | 5/1976 | Switzerland . |
| 2125561 | 3/1984 | United Kingdom . |
| WO9524624 | 3/1995 | WIPO . |

OTHER PUBLICATIONS

Solheim, Instrumenteringsteknikk, 1962, pg. 118 (with translation of relevant text).

*Primary Examiner*—William Oen
*Attorney, Agent, or Firm*—Oppenheimer Wolff & Donnelly LLP

[57] ABSTRACT

A pressure sensor for measuring high pressures, the sensor being adapted to act externally on a measuring element, the measuring element having a central cavity and being composed of two parts which are sealingly joined in order to form the cavity, and comprising sensor means for measuring the mechanical stress condition of the measuring element. The two parts of the measuring element are manufactured in planar technology form silicium or quartz and have a substantially larger length than lateral dimensions, the cavity being oriented in a longitudinal direction, and the sensor means being piezo-resistive elements lying adjacent to the external or internal surface of the measuring element.

25 Claims, 3 Drawing Sheets

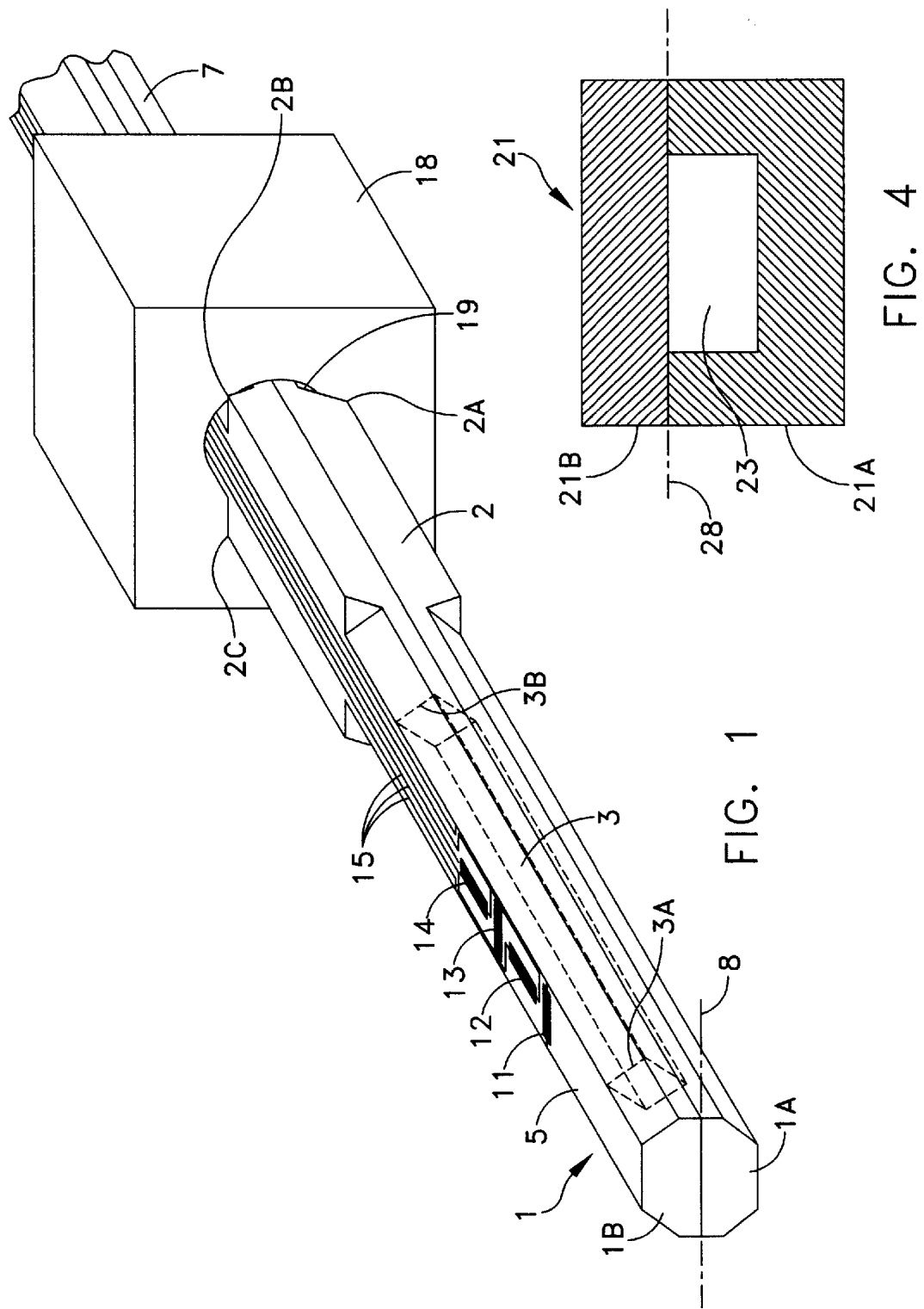

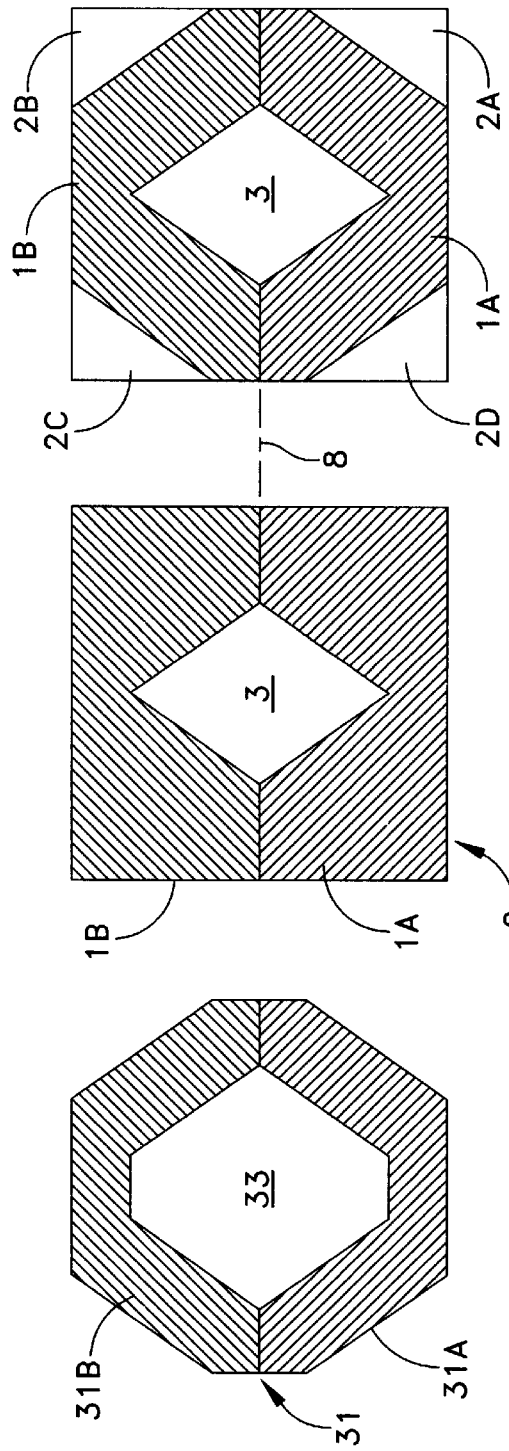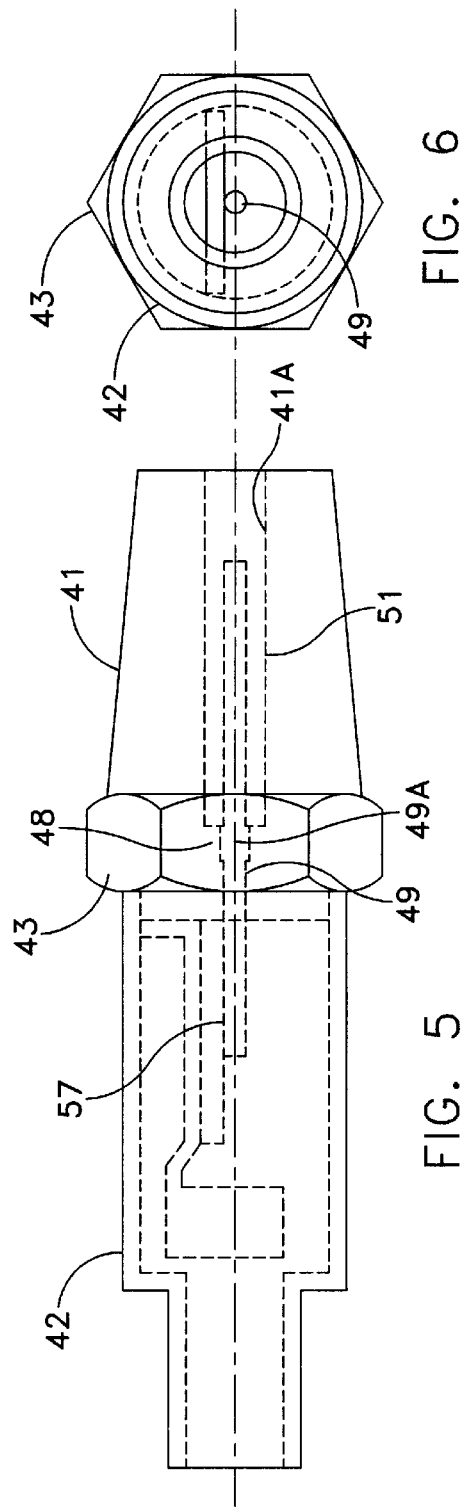

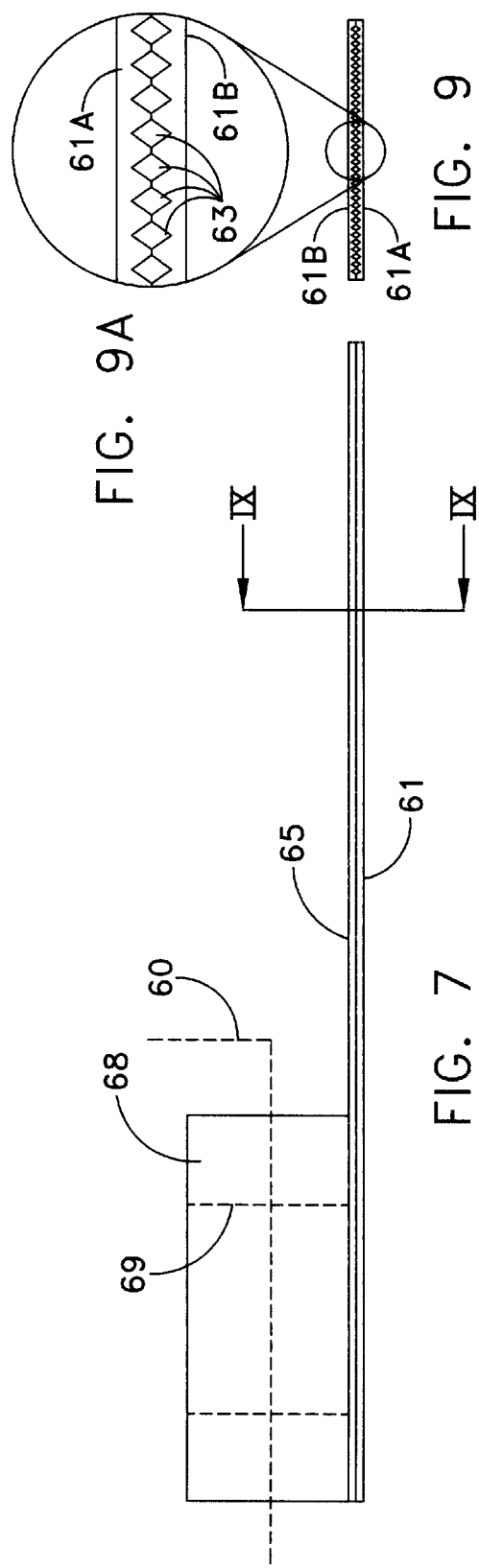
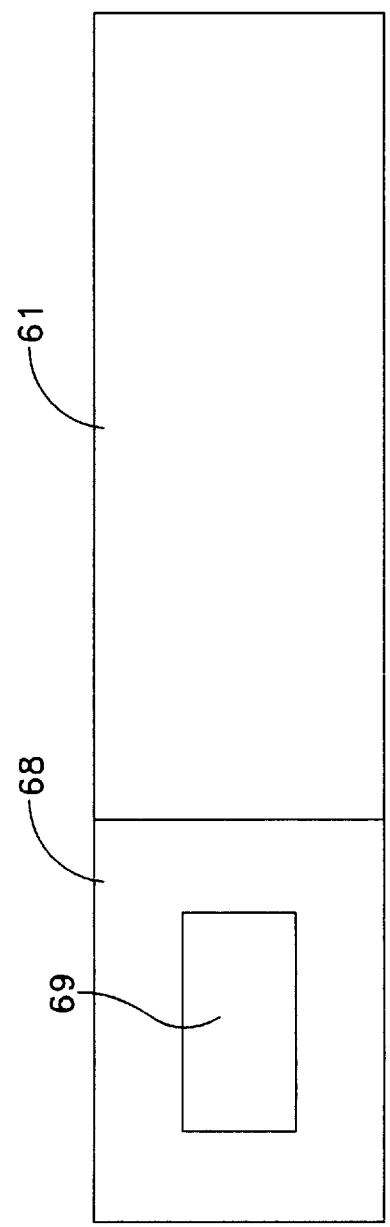

PRESSURE SENSOR

BACKGROUND OF THE INVENTION

Field of the Invention

This invention relates to a pressure sensor in particular for very high pressures, preferably adapted to act externally on a measuring element, the measuring element having a central cavity and being composed of two parts which are sealingly joined in order to form the cavity, and comprising sensor means for the mechanical stress condition of the measuring element when subjected to pressure.

In principle a pressure sensor consists of a spring element (measuring element) and a measurement or sensor device. Usual commercially available pressure sensors based on silicium technology can employ membranes as spring element, provided with piezo-resistive resistors as sensor means. Spring elements as membranes are unfavorable at high pressures because they are sensitive to effects related to the clamping in a substrate with a transition to materials having an unequal modulus of elasticity. The stress detected in such membranes will be a combination of compressive and tensile stresses. If the tensile stresses become sufficiently high, a break can occur. At large deformations the stresses in a membrane will not be a linear function of pressure, which results in a non-linear signal.

Pressure sensors for high pressures as indicated above, are in general previously known, and a specific example may be found in Norwegian patent application No. 94.0785. A pressure sensor according to Norwegian patent application No. 94.0785 is based upon the Bourdon effect, with a capacitive reading of the deflection. This known pressure sensor is based on tubular measuring elements, but the internal cavity or cavities is/are always disposed eccentrically, so as to obtain a bending of the element. When such bending takes place shear stresses can be generated in the joints, which in turn can lead to failure therein. A drawback with capacitive reading is that when very high pressures are concerned, it is desireable to have very small outer diameters, which results in extremely small capacitances. It is very difficult to detect these. Another drawback with capacitive detection consists therein that the measuring element can not be directly subjected to the process medium. This is because the capacity is sensitive to the dielectric constant of the medium and will be very sensitive to contamination in the form of particles which can get into the capacitor gap.

In the book "Instrumenteringsteknikk" by Ole A. Solheim, Tapir publishers Trondheim 1966, there is a description on page 118 of the measurement principle employed here. According to the book this measurement principle comprises the attachment of strain gauges on a tubular measuring element. On the surface of the element the stresses in the azimuthal direction will always be twice as high as in the axial direction. The difference in stress between these two directions will be proportional to the pressure. If there is provided for application of the highest pressure externally of the tubular element, tensile stresses that can lead to breaking are avoided. The known measurement principle is in part utilized in a more modern design according to European patent publication 0.107.549. The designs according to this publication, however, do not take advantage of the difference between axial and radial stress upon external or internal pressure application, but are only based on deformation changes. The sensor devices operate with acoustic surface waves, which means that the complete pressure sensor must have total dimensions above a certain lower limit.

Another and somewhat less interesting example from the patent literature, is to be found in French patent publication 2.531.533.

SUMMARY OF THE INVENTION

On the background of the previously known techniques, a pressure sensor as recited in the introduction above, has novel and specific features consisting in the first place therein that the two parts of the measuring element are manufactured in planar technology, preferably of silicium or quartz, and have a substantially larger length than lateral dimensions, with the cavity oriented in the longitudinal direction, and that the sensor devices are in the form of piezo-resistive resistive elements lying adjacent to an external or an internal surface of the measuring element.

One or both parts of the measuring element is/are provided with elongate recesses or channels from one of the major surfaces thereof, so that when the two parts are joined, the cavity mentioned will be formed, and in general the cavity can be regarded as tubular. Preferably the measuring element according to the invention has a length being at least of an order of magnitude ten times the lateral dimensions. Normally a straight design is preferred, so arranged that a difference in pressure at the inside and the outside can be detected. It is an advantage that the geometry of the measuring element serves to avoid bending (Bourdon effect) when subjected to pressure, and that shear stresses in the joining surfaces as well as tensile stresses are minimized. As will be seen from the following description this is favorably obtained by having the cavity located centrally in the cross section of the measuring element. The cavity is either made available for a reference pressure for differential pressure measurement, or is closed with a confined reference pressure, preferably vacuum, for measuring absolute pressures. The outside of the measuring element can be designed for the purpose of being subjected to the pressure to be measured, either by being directly subjected to a process medium or to a known or selected medium being separated from the process medium by means of an isolating membrane in a manner known per se.

By having the invention based on the use of micromechanical manufacturing techniques, namely planar technology, it is possible to produce measuring elements according to the invention with very small dimensions, which is particularly advantageous when the measurement of extremely high pressures is concerned. Moreover the elongate design is very favorable in view of required mounting, integration or packaging of the actual measuring elements in practical measuring apparatuses.

It is an independent aspect per se of this invention, to provide a novel and specific measuring apparatus having associated supporting or mounting means in a surrounding housing or holding member.

BRIEF DESCRIPTION OF DRAWINGS

In the following description the invention will be explained more closely with reference to various embodiments being illustrated as examples on the drawings, wherein:

FIG. 1 in perspective view shows a first embodiment of a measuring element according to the invention, mounted in a holder, FIG. 2A shows an enlarged cross section of the main part of the measuring element in FIG. 1, FIG. 2B in enlarged cross section shows an abutment portion of the measuring element in FIG. 1, close to the holder mentioned above, FIG. 3 in corresponding cross section as in FIGS. 2A and 2B, shows a variant of the cross-sectional shape of the measuring element, i.e. the cross section of the cavity, FIG. 4 shows another variant of the cross-sectional shape, i.e. a rectangular main shape, FIG. 5 in simplified elevation view shows a measuring apparatus with a measuring element according to the invention incorporated therein, FIG. 6 shows the apparatus of FIG. 5 from the (left-hand) end, FIG. 7 in elevation shows a specific embodiment of a measuring element according to the invention, with a cavity subdivided into individual channels, FIG. 8 shows the measuring element of FIG. 7 from above, FIG. 9 shows the measuring element in cross-sectional view along the line IX—IX in FIG. 7, and FIG. 9A is an enlarged detail of the cross section in FIG. 9.

DETAILED DESCRIPTION OF THE PREFERRED EMBODIMENT

In the example shown in FIG. 1 an elongate measuring element 1 is composed of two parts 1A and 1B. These are identical and form together an internal cavity 3 between two end walls 3A and 3B. Thus the cavity 3 does not extend quite to the ends of the main part of the measuring element 1, which is here shown with an octagonal cross section.

A surface 5 of the measuring element is provided with sensor devices 11,12,13 and 14, which through a number of leads 15 are connected to external electronics or measuring circuits. Sensor means 11,12,13 and 14 are in the form of piezo-resistive elements being known per se and being preferably arranged in a bridge circuit. The sensor is sensitive to changes in the mechanical stress condition or deformation of the measuring element when subjected to varying pressure differences between the ambient medium and the internal cavity 3.

At the inner end thereof the octagonal main part 1 of the measuring element continues as an abutment portion 2 having a square outer cross-sectional contour, for the purpose of cooperating with a holding member 18 in which the whole measuring element is mounted. Thus holding member 18 has a through hole 19, being preferably circular, and adapted to receive a mounting portion 7 of the measuring element, this portion 7 having advantageously the same outer cross sectional contour as the main part 1. Abutment portion 2 serves to provide for a secure engagement of the measuring element against holding member 18, this being of particular interest when the measuring element is subjected to very high external pressures. Such pressures will seek to force the measuring element 1 in axial direction into the hole 19, but the projecting corners, 2A,2B,2C and 2D (see also FIG. 2A), will effectively block against displacement of the measuring element under such pressure application. Through the hole 19 the mounting portion 7 can be additionally fixed by means of a suitable adhesive which fills the interspace between the octagonal cross section and the circular hole 19.

FIG. 2A in more detail shows the cross-sectional shape of the measuring element, comprising the two parts 1A and 1B which are joined at the plane being indicated at 8. In FIG. 2A the four corners 2A,2B,2C and 2D are shown, serving for abutment or engagement against holder 18.

The square outer cross-sectional contour in FIG. 2B corresponds to the cross section of abutment portion 2, but the inner cavity 3 actually is not present within abutment portion 2 when absolute pressure measurement is concerned, i.e. with a closed cavity 3 between end walls 3A and 3B as in FIG. 1. Thus FIG. 2B can be considered to illustrate an alternative main shape of the effective length of a measuring element 1, where the cavity 3 can have the same cross sectional shape as in FIG. 2A and FIG. 1. Thus according to the invention it is an advantage to design the cavity 3 with a diamond shaped cross section, having two S corners positioned in the joining plane 8 between the two parts 1A and 1B.

FIG. 3 shows a variant whereby the outer cross-sectional contour of measuring element 31 is the same as in FIG. 2A, i.e. octagonal, whereas the inner cavity 33 has a hexagonal cross-sectional profile. This in similarity to cavities 3, having a diamond shape, is well suited for manufacturing in planar technology, in particular by etching. In addition to a rectangular and octagonal outer cross-sectional contour, the measuring element according to the invention can be manufactured with a polygonal outer cross-sectional contour in other variants, such as a hexagonal cross section.

Based upon planar technology as mentioned, the two parts of the measuring element can be advantageously joined by means of anodic bonding or also by so-called fusion bonding. Whereas the measuring element cross sections being illustrated as examples in FIGS. 1,2A,2B and 3 are symmetrical about the joining plane 8 (and besides about a central plane normal thereto), the rectangular cross section in FIG. 4 is composed of two parts 21A and 21B which do not have the same cross-sectional shape. Part 21A is thicker and is the only one provided with a recess 23 forming the desired cavity. A joining plane is shown at 28, whereby part 21B quite simply is a suitable plate-shaped part forming together with part 21A the complete cross section of measuring element 21. Also in this embodiment, however, the cavity 23 will be located centrally and symmetrically within the total cross section of measuring element 21.

FIGS. 5 and 6 show a practical example of a more complete measuring apparatus incorporating a measuring element according to the invention. A housing or a holder as shown in FIG. 5 comprises three main parts, i.e. a sleeve part 41 having a central bore 41A, an inner part 42 which preferably can be provided with external threads, and an intermediate part 43 being externally designed as a nut head. Sleeve part 41 is intended to be inserted into the zone where a pressure is to be measured, since the effective main part of a measuring element 51 is mounted so as to project out into bore 41A. At the other side the inner part 42 is adapted to be located at the low pressure side, provided that there is a higher pressure to be measured by means of measuring element 51. Intermediate part 43 can be considered to comprise a holding member 48 corresponding to holding member 18 in FIG. 1., with a hole 49 having a wider portion 49A for receiving the abutment portion of the measuring element corresponding to portion 2 in FIG. 1. A mounting portion 57 belonging to measuring element 51, penetrates through hole 49 and further into the interior of part 42, for electrical connection to electronics therein or electrical circuits being located outside at the low pressure side.

Finally FIGS. 7,8,9 and 9A show a particular embodiment according to the invention, whereby the measuring element has a strongly flattened cross-sectional shape, as will be seen specifically from FIGS. 9 and 9A. Two parts 61A and 61D manufactured in planar technology are here as in the previously described embodiments, joined so that the measuring element 61 will have a typical plate shape. Here the internal cavity is subdivided into a large number of separate channels, of which four channels are shown at 63 in FIG. 9A. Such an arrangement of several parallel and longitudinal cavities or channels in measuring element 61, in certain respects can be advantageous. The effect as regards detection of stresses occurring when the measuring element is subjected to pressure, also here can be detected favourably by means of sensor devices in the form of piezo-resistive elements on or adjacent to a major surface, for example the surface 65 as shown in FIG. 7. Sensor devices with electrical leads are not particularly shown in any of FIGS. 7–9A, but can be arranged in a quite corresponding manner as shown at surface 5 in FIG. 1.

At 60 in FIG. 7 there is schematically indicated a boundary between the high pressure side and the low pressure side, a mounting member 68 being provided at the major surface 65 of the measuring element, for example by anodic bonding. Mounting member 68 is hollow as shown at 69, for carrying electrical leads out from the sensor devices (not shown) on measuring element 61. The hollow interior 69 of mounting member 68 thus is adapted to communicate with the low pressure side, so that a practical and advantageous transition between the high pressure side and the low pressure side is obtained, among other things in view of the required electrical connection from the sensor devices. As is also the case in FIG. 1, the piezo-resistive elements here will be advantageously integrated into the structure of the measuring element, i.e. in particular part 61B adjacent to surface 65. The piezo-resistive element as well as leads thereto more specifically can be arranged as buried inside the surface concerned at the measuring element, i.e. the surface 5 in FIG. 1 and surface 65 in FIG. 7.

The form of mounting or "packaging" of measuring element 61 as appears from FIGS. 7 and 8, whereby mounting member 68 is a substantial component, is advantageous in certain cases, and this has substantial significance in a complete measuring apparatus. The manner of mounting in this embodiment is closely related to the strongly flattened, plate-like shape of measuring element 61.

As already explained above the mounting or packaging of the more "normal" measuring element 1 in FIG. 1, is rather different from the packaging method in FIGS. 7 and 8. Besides it will be realised that the packaging method according to FIG. 1 (and FIG. 5) can be of interest as such also for measuring elements of other design and for other purposes than what is described here. In all such variants, however, it will be an advantage that the measuring element is much elongated, as discussed above, such as with a length dimension typically being of an order of magnitude as ten times the lateral dimensions of the element. Such an elongate shape is very practical for this particular packaging method, although for the production economy per se it could have been attractive to employ relatively shorter elements. Of substantial significance both with respect to production and for the actual mounting, is the abutment portion 2 described in this embodiment. An important detail in this connection is that the abutment faces at the projecting corners 2A,2B,2C and 2D (see also FIG. 2A) can extend at an inclination and not be directly radial in a plane at right angle to the axis of the measuring element.

In connection with mounting, packaging and encapsulation of such a measuring element, it is obvious that on the surface thereof a protective film can be applied, for example of $Si_3N_4$, or a polyamid-plastic material, so that the measuring element can be directly exposed to the pressure medium concerned.

Also a number of other modifications and variants are possible within the framework of the invention, perhaps in particular related to the desire of obtaining efficient and economic production processes. For example each of the two parts of the measuring element per se can be an assembled structure, where layers of different types of materials can be included. Moreover it is obvious that for pure strength reasons a circular internal cavity would have been the ideal shape, but with respect to production such a shape is not advantageous. A still further, possible modification consists therein that sensor devices can be provided at more than one surface of the measuring element, for example at two major surfaces facing oppositely from each other.

What is claimed is:

1. A pressure sensor for high pressures comprising a measuring element having an external surface and a central cavity defined by an internal surface of said measuring element and being composed of two parts which are sealingly joined in order to form the cavity, and comprising sensor means for measuring a mechanical stress condition of the measuring element wherein:

the two parts of the measuring element are manufactured in planar technology and have a substantially larger length than lateral dimensions, the cavity being centrally located within said measuring element, oriented in the longitudinal direction, and having a cross-sectional shape that is symmetric about at least two longitudinal planes, and said sensor means being piezo-resistive elements lying adjacent to at least one of said external and said internal surfaces of the measuring element.

2. A pressure sensor according to claim 1, wherein the length of the measuring element is at least of ten times the lateral dimensions.

3. A pressure sensor according to claim 1 wherein the outer cross sectional shape of the measuring element is selected from rectangular, hexagonal and octagonal shapes and symmetric about two longitudinal planes.

4. A pressure sensor according to claim 1 wherein the cross section of the cavity is diamond shaped with two opposite corners located in the joining plane between the two parts forming the measuring element.

5. A pressure sensor according to claim 1 wherein the two parts have identical cross sectional shapes.

6. A pressure sensor according to claim 1 wherein said two parts have different thicknesses and that the cavity is formed by a recess in both of the parts, from the surface facing the other part.

7. A pressure sensor according to claim 1 wherein the two parts are joined by anodic bonding.

8. A pressure sensor according to claim 1 wherein the two parts are joined by fusion bonding.

9. A pressure sensor according to claim 1 wherein the cavity is adapted to receive a reference pressure.

10. A pressure sensor according to claim 1 wherein the measuring element is mounted in a holder having a circular hole defined through a wall of said holder and forming a measuring element-mounting portion of said holder, wherein the measuring element is disposed adjacent to said mounting portion in the hole at a high pressure side of said wall and wherein said measuring element is provided with an abutment portion the outer cross-sectional contour of which at certain places is located radially outside the circumference of the hole.

11. A pressure sensor according to claim 10, wherein the outer cross-sectional contour of the mounting portion comprises radially projecting corners in relation to the otherwise polygonal outer cross-sectional shape of the measuring element.

12. A pressure sensor according to claim 10 wherein leads to the piezo-resistive elements are integrated into the structure of the measuring element.

13. A pressure sensor according to claim 12 wherein the piezo-resistive elements and leads thereto, are buried within the surface of the measuring element.

14. A pressure sensor according to claim 1 wherein the piezo-resistive elements are arranged in an electrical bridge circuit.

15. A pressure sensor according to claim 1 wherein said measuring element comprises a flattened cross-section so as to define a major external surface and said cavity comprises a plurality of individual channels arranged side by side.

16. A pressure sensor according to claim 15, wherein said major surface of the measuring element is joined to a hollow mounting member, said hollow mounting member being externally adapted to be subjected to high pressure and internally adapted to be located at low pressure and further wherein leads for said sensor means extend outwardly from said sensor means into the hollow mounting member.

17. A measuring apparatus for measuring high pressures comprising:
    a measuring element having a side that is externally subjected to the high pressure and thereby to a relatively large force, wherein the measuring element is manufactured in planar technology and is mounted in a housing having a through-hole defined in a wall of said housing and forming a measuring element-mounting portion of said housing,
    the measuring element being provided with an abutment portion adjacent to said measuring element-mounting portion at said high pressure side of said measuring element, and wherein the outer cross sectional contour of said measuring element at certain places is located radially outside the circumference of the hole.

18. A measuring apparatus according to claim 17, wherein the outer cross-sectional contour of the abutment portion comprises radially projecting corners in relation to a polygonal outer cross-sectional shape of the measuring element.

19. A pressure sensor according to claim 1 wherein high pressure acts externally upon said measuring element.

20. A pressure sensor according to claim 1 formed of silicium.

21. A pressure sensor according to claim 1 formed of quartz.

22. A pressure sensor according to claim 11 wherein said mounting portion comprises a polygonal outer cross-sectional shape.

23. A measuring apparatus according to claim 17 formed of silicium.

24. A measuring apparatus according to claim 17 formed of quartz.

25. A measuring apparatus according to claim 18 wherein said mounting portion comprises a polygonal outer cross-sectional shape.

* * * * *